United States Patent
Brown (10) Patent No.: US 8,378,606 B2
(45) Date of Patent: Feb. 19, 2013

(54) SYNCHRONIZED MINIMUM FREQUENCY PULSE WIDTH MODULATION DRIVE FOR SENSORLESS BRUSHLESS DIRECT CURRENT MOTOR

(75) Inventor: Ward R. Brown, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 346 days.

(21) Appl. No.: 12/767,052

(22) Filed: Apr. 26, 2010

(65) Prior Publication Data

US 2011/0084639 A1    Apr. 14, 2011

Related U.S. Application Data

(60) Provisional application No. 61/249,729, filed on Oct. 8, 2009.

(51) Int. Cl.
*H02P 6/00* (2006.01)
(52) U.S. Cl. ............. 318/400.35; 318/599; 318/400.01; 318/700; 318/606; 318/400.23
(58) Field of Classification Search ............... 318/400.1, 318/400.35, 599, 606, 254.1, 400.23
See application file for complete search history.

(56) References Cited

U.S. PATENT DOCUMENTS

| | | | | |
|---|---|---|---|---|
| 6,121,736 A | * | 9/2000 | Narazaki et al. | 318/400.35 |
| 6,396,225 B1 | * | 5/2002 | Wakui et al. | 318/400.01 |
| 7,183,734 B2 | * | 2/2007 | Lassen | 318/400.34 |
| 7,298,106 B2 | * | 11/2007 | Yamamoto et al. | 318/400.27 |
| 7,531,976 B2 | * | 5/2009 | Fukamizu et al. | 318/400.34 |
| 7,649,329 B2 | * | 1/2010 | Cheng | 318/400.05 |
| 2004/0189221 A1 | | 9/2004 | Kurosawa et al. | 318/254 |

FOREIGN PATENT DOCUMENTS

| EP | 1482632 A2 | * | 12/2004 |
|---|---|---|---|
| EP | 1710903 A2 | | 10/2008 |

OTHER PUBLICATIONS

International PCT Search Report, PCT/US2010/051441, 10 pages, Mailed Feb. 1, 2012.
Brown, Ward, "Brushless DC Motor Control Made Easy", Microchip Technology Inc., AN857, 48 pages, Sep. 12, 2002.
Yedamale, Padmaraja, "Brushless DC (BLDC) Motor Fundamentals", Microchip Technology Inc., AN885, 20 pages, Nov. 11, 2003.
Lepkowski, Jim, "Motor Control Feedback Circuits", Microchip Technology Inc., AN894, 18 pages, Dec. 31, 2003.
Yedamale, Padmaraja, "Using the PIC18F2431 for Sensorless BLDC Motor Control", Microchip Technology Inc., AN970; 18 pages, Feb. 7, 2005.

* cited by examiner

*Primary Examiner* — Rita Leykin
(74) *Attorney, Agent, or Firm* — King & Spalding L.L.P.

(57) ABSTRACT

Drive voltages to a sensorless brushless DC motor are regulated by varying the width of a single drive pulse (PWM pulse) centered in each of the commutation periods. Switching losses are thereby cut to an absolute minimum because there are only two transitions (on and off) in each drive commutation period. Back EMF zero-cross detectors determine the electrical timing relationships during each electrical cycle. Since the PWM drive pulses are always centered in each of the commutation periods, there will always be back EMF available for measurement of "zero-crossings." A digital device controls power switching transistors to produce one single PWM pulse during each of the commutation periods.

25 Claims, 5 Drawing Sheets

FIGURE 5 ously at every 60 electrical degrees, phase current switching is updated (commutation). However, one electrical cycle may not correspond to one mechanical revolution (360 mechanical degrees) of the motor rotor. The number of electrical cycles to be repeated to complete one mechanical revolution depends upon the number of rotor pole pairs. For example, a four-pole BLDC motor will require two electrical cycles to complete one mechanical revolution of the motor rotor (see FIG. 3).

SYNCHRONIZED MINIMUM FREQUENCY PULSE WIDTH MODULATION DRIVE FOR SENSORLESS BRUSHLESS DIRECT CURRENT MOTOR

RELATED PATENT APPLICATION

This application claims priority to commonly owned U.S. Provisional Patent Application Ser. No. 61/249,729; filed Oct. 8, 2009; entitled "Synchronized Minimum Frequency Pulse Width Modulation Drive for Sensorless Brushless Direct Current Motor," by Ward R. Brown; and is related to commonly owned U.S. patent application Ser. No. 12/767,101; filed Apr. 26, 2010; entitled "Variable Pulse Width Modulation for Reduced Zero-Crossing Granularity in Sensorless Brushless Direct Current Motors," by Ward R. Brown; and U.S. patent application Ser. No. 12/767,017; filed Apr. 26, 2010; entitled "Slow Speed Operation of Brushless Direct Current Motors by Gating Pulse Width Modulation Drive," by Ward R. Brown; wherein all are hereby incorporated by reference herein for all purposes.

TECHNICAL FIELD

The present disclosure relates to sensorless brushless direct current (BLDC) motors, and more particularly, to synchronized minimum frequency pulse width modulation (PWM) drive for a sensorless BLDC motor.

BACKGROUND

Brushless direct current (BLDC) motors are used in industries such as appliances, automotive, aerospace, consumer, medical, industrial automation equipment and instrumentation. BLDC motors do not use brushes for commutation, instead, electronic commutation is used. BLDC motors have advantages over brushed DC motors and induction motors such as: better speed versus torque characteristics, high dynamic response, high efficiency, long operating life, longer time intervals between service, substantially noiseless operation, and higher speed ranges. More detailed information on BLDC motors may be found in Microchip Application Notes: AN857, entitled "Brushless DC Motor. Control Made Easy," (2002); AN885, entitled "Brushless DC (BLDC) Motor Fundamentals," (2003); AN894, entitled "Motor Control Sensor Feedback Circuits," (2003); AN901, entitled "Using the dsPIC30F for Sensorless BLDC Control," (2004); and AN970, entitled "Using the PIC18F2431 for Sensorless BLDC Motor Control," (2005); all are hereby incorporated by reference herein for all purposes.

A three-phase BLDC motor completes an electrical cycle, i.e., 360 electrical degrees of rotation, in six steps at 60 electrical degrees per step. Synchron Drive commutation for a sensorless BLDC motor may also be determined by monitoring the back electromotive force (EMF) voltages at each phase (A-B-C) of the motor. The drive commutation is synchronized with the motor when the back EMF of the un-driven phase crosses one-half of the motor supply voltage during a commutation period. This is referred to as "zero-crossing" where the back EMF is equal to one-half of the motor supply voltage, over each electrical cycle. Zero-crossing is detected on the un-driven phase when the drive voltage is being applied to the driven phases. A voltage polarity change about the zero-crossing voltage of the back EMF on the un-driven phase may also be used in detecting a zero-crossing event, e.g., from positive to negative or negative to positive during application of the drive voltage to the driven phases within certain limits.

The rotational speed of a BLDC motor is dependent upon the amplitude of the average DC voltages applied to the stator windings of the motor. The higher the average DC voltage applied, the faster will the BLDC motor rotate. Generally, DC voltages are generated using pulse width modulation (PWM) to control the voltage amplitudes applied to the stator windings. The PWM maximum frequency is limited by the switching losses of the drive transistors. The PWM minimum frequency is limited by the undesirable audio emissions at frequencies in the audio range. An acceptable compromise is in the 15 KHz to 20 KHz range. PWM duty cycle can only be reduced to the point where the drive pulse width can still propagate through the drive power field effect transistors (FETs) and low-pass filter characteristics inherent in all motor designs. Reducing the PWM frequency would allow longer drive periods but this would also introduce audible noise from the motor. Every PWM signal pulse requires power switching transistors, e.g., power field effect transistors (FETS), to turn on and off. Rapidly turning power switching transistors on and off creates power losses as the transistors go from an off-condition through a voltage/current transition to an on-condition. Typically, power losses are low when the power switching transistor is saturated to full conduction in the on-state, and substantially no current flow in the off-state. Getting power switching transistors from the off-state to the on-state and visa-versa, creates significant power losses in these transistors. The more the power transistors are switched between the on and off states, the greater the power losses and power dissipation in the power transistors.

Motor drive switching losses in the power transistors at high power loads are exacerbated because power dissipated therein is the square of the current times the increased resistance during the on-off-on-off transition times. As drive current increases the power dissipated in the power switching transistors increase exponentially. Gaps in drive voltage caused by the PWM off periods create timing errors in sensorless zero cross detection. Furthermore PWM signal generation at high frequencies lead to inefficiencies of the power switching transistors and failures due to overheating of the power switching transistors.

SUMMARY

The aforementioned problems are solved, and other and further benefits achieved by reducing the number of on and off transitions of the power transistors in a commutation period. The lowest number of on and off transitions in a commutation period is two, thereby creating one PWM drive pulse per commutation period. According to the teachings of this disclosure, the drive voltage to the sensorless brushless DC motor is regulated by varying the width of a single drive pulse (PWM pulse) centered in each of the commutation periods. Switching losses are thereby cut to an absolute minimum because there are only two transitions (on and off) in each drive commutation period.

According to a specific example embodiment of this disclosure, a method for controlling speed of a sensorless brushless direct current motor comprises the steps of: determining each commutation period in an electrical cycle of a sensorless brushless direct current motor by measuring back electromotive force voltage at each phase connection of the sensorless brushless direct current motor; generating pulse width modulation (PWM) control pulses, the PWM control pulses each having one on and one off transition during respective ones of the commutation periods, wherein each single PWM control pulse is substantially centered within its respective commutation period; and driving power switching transistors with the PWM control pulses for each of the commutation periods, wherein the power switching transistors are connected between stator coils of the sensorless brushless direct current motor and a direct current power source.

According to another specific example embodiment of this disclosure, a method for controlling speed of a sensorless brushless direct current motor comprises the steps of: determining electrical timing centers for each of a plurality of commutation periods of a sensorless brushless direct current motor by measuring back electromotive force voltages at each stator coil of the sensorless brushless direct current motor, and determining from the measured back electromotive force voltages when each of the measured back electromotive force voltages is at substantially a zero-crossing voltage value, wherein the zero-crossing voltage value is about one-half of a voltage value of a direct current power source; generating a single pulse width modulation (PWM) control pulse during each of the plurality of commutation periods, wherein each single PWM control pulse has one on and one off transition during its respective commutation period and the single PWM control pulse for the respective commutation period is substantially centered within that respective commutation period; and driving power switching transistors with the PWM control pulses during the plurality commutation periods, wherein the power switching transistors are connected between the stator coils of the sensorless brushless direct current motor and the direct current power source.

BRIEF DESCRIPTION OF THE DRAWINGS

A more complete understanding of the present disclosure thereof may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

Figure 1:
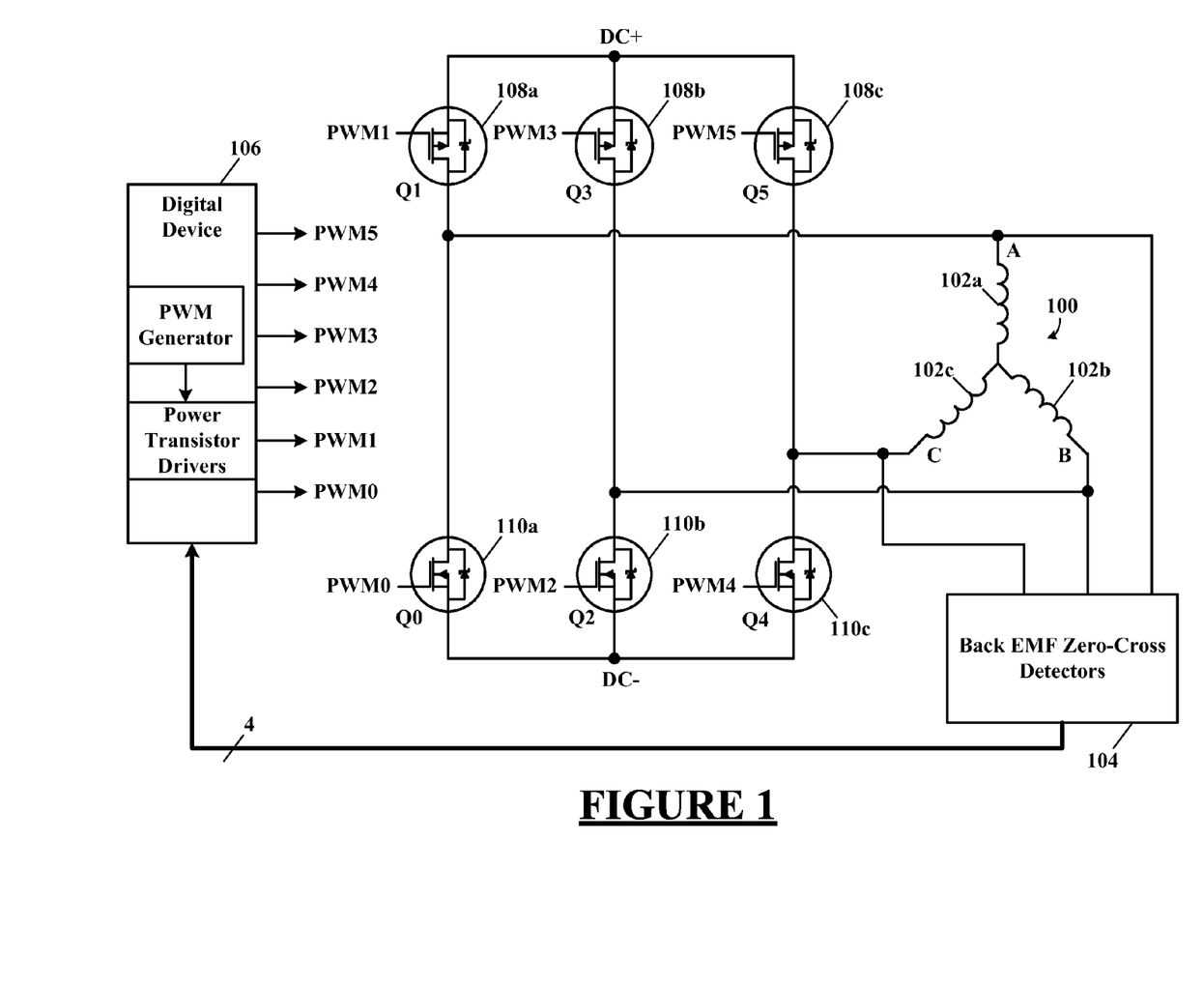
FIG. 1 illustrates a schematic diagram of a three-phase sensorless brushless direct current motor and electronically commutating motor controller, according to a specific example embodiment of this disclosure.

Referring to FIG. 1, depicted is a schematic diagram of a three-phase sensorless brushless direct current motor and electronically commutating motor controller, according to a specific example embodiment of this disclosure. A three-phase sensorless brushless direct current motor, generally represented by the numeral 100, comprises a plurality of stator coils 102 and a rotor (not shown) having magnets arranged in a three-phase configuration. For discussion purposes the motor 100 described herein will be in a two pole three-phase configuration requiring 360 degrees of electrical rotation to produce one mechanical revolution of 360 degrees. The motor 100 is electronically commutated with power switching transistors 108 and 110 connected to the three-phase sensorless brushless direct current motor 100 and a direct current (DC) power source. Back electromotive force (EMF) zero-cross detectors 104 and a digital device 106, e.g., a microcontroller, having PWM generators that provide pulse width modulation (PWM) outputs coupled to power transistor drivers. The power transistor drivers (PWM0-PWM5) control turn-on and turn-off of the power switching transistors 108 and 110.

The motor 100 is electronically commutated from a direct current (DC) source (not shown) through the power switching power transistors 108 and 110, e.g., power field effect transistors (one pair per phase for a three-phase motor). The power transistors 108 and 110 are controlled by the digital device 106, e.g., a microcontroller, that is coupled to the power transistors 108 and 110 through drivers for the power transistors (not shown). The digital device 106 provides six pulse width modulation (PWM) outputs, PWM0-PWM5, that control both the motor rotation direction and speed by turning on and off selected phase pairs of the power transistors 108 and 110 according to PWM signals appropriately sequenced and timed.

Each stator coil 102 is connected to the positive of the DC power source for two commutation periods, the negative of the DC power source for two commutation periods, and is disconnected from both the positive and negative of the DC power source for two commutation periods. The motor phase position is determined by back electromotive force (EMF) voltages measured at a stator coil 102 when not connected to the DC power source at the time of measurement while the other two stator coils 102 are connected to the DC power source. The back EMF voltages at each of the stator coils 102 are monitored by the back EMF zero-cross detectors 104 (one per phase). However, the back EMF voltage to be measured requires connection to the positive of the DC power source of one of the stator coils 102 so as to enable current flow therethrough, thereby biasing the motor generated voltage to a level centered around the detection reference level ("zero-crossing" event), e.g., one-half the supply voltage. The other stator coil 102 of the pair of coils having current flow therethrough is connected to the negative of the DC power source.

Figure 2:
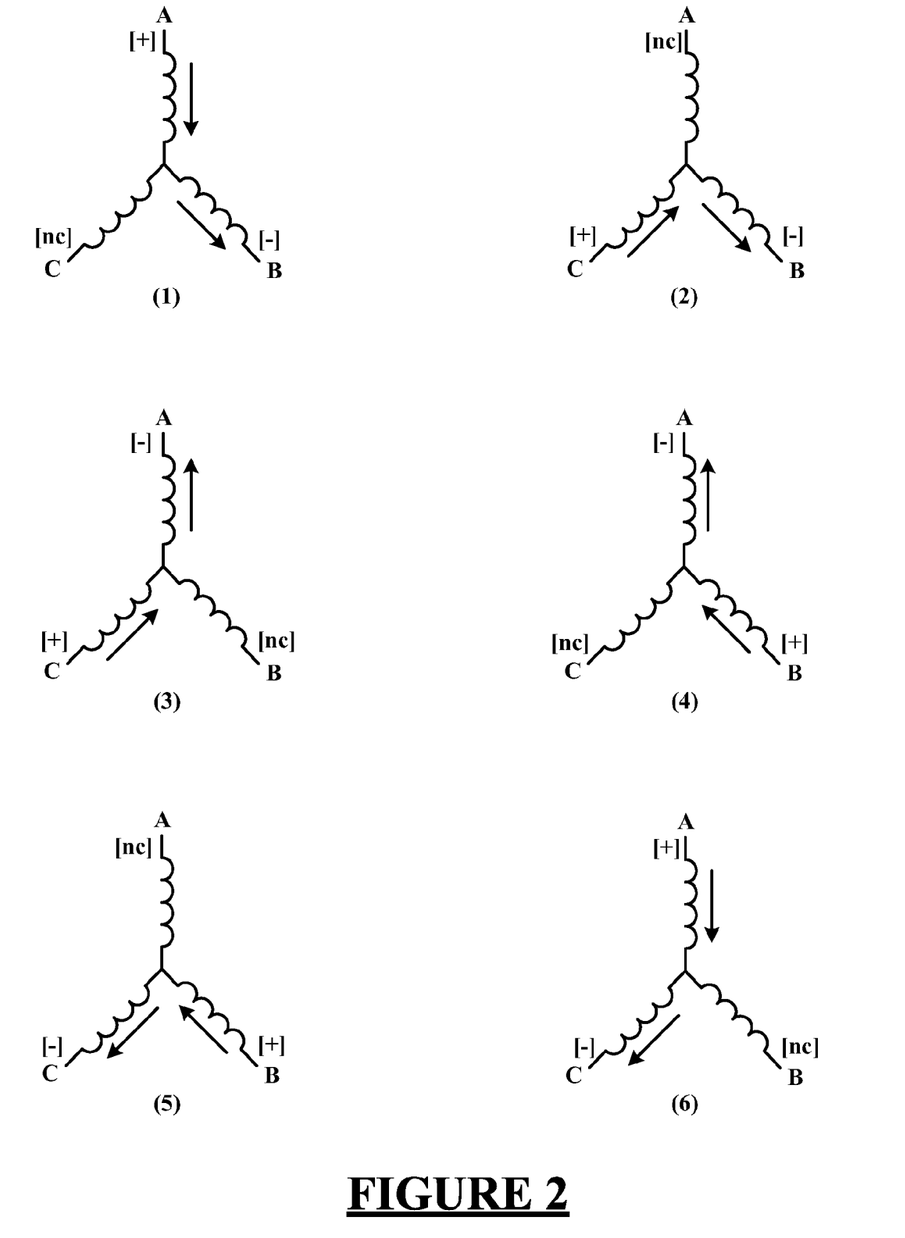
FIG. 2 illustrates schematic diagrams showing current flows in each of the three stator windings of a three-phase sensorless brushless direct current motor during each 60 degree commutation period.

Referring to FIG. 2, depicted are schematic diagrams showing current flows in each of the three stator windings (coils 102) of a three-phase sensorless brushless direct current motor during each 60 degree commutation period. Rotation of the motor 100 is divided into six commutation periods (1) through (6), and current flows through different combinations of two of the three coils 102 during each of the six commutation periods. While combinations of two of the coils 102 are connected to the DC power source, a third coil 102 (three-phase motor) is not connected to the power source. However the unconnected coil 102 is monitored by the back EMF zero-cross detectors 104 such that upon detection of a "zero crossing" event, i.e., back EMF voltage on the unconnected coil 102 changes polarity while going through a substantially zero voltage ("zero voltage" is defined herein as one-half of the DC supply voltage). At approximately the zero voltage point detected by a respective one of the back EMF zero-cross detectors 104, a synchronization relationship of the motor 100 stator coils 102 is ascertained, as more fully described hereinbelow.

Figure 3:
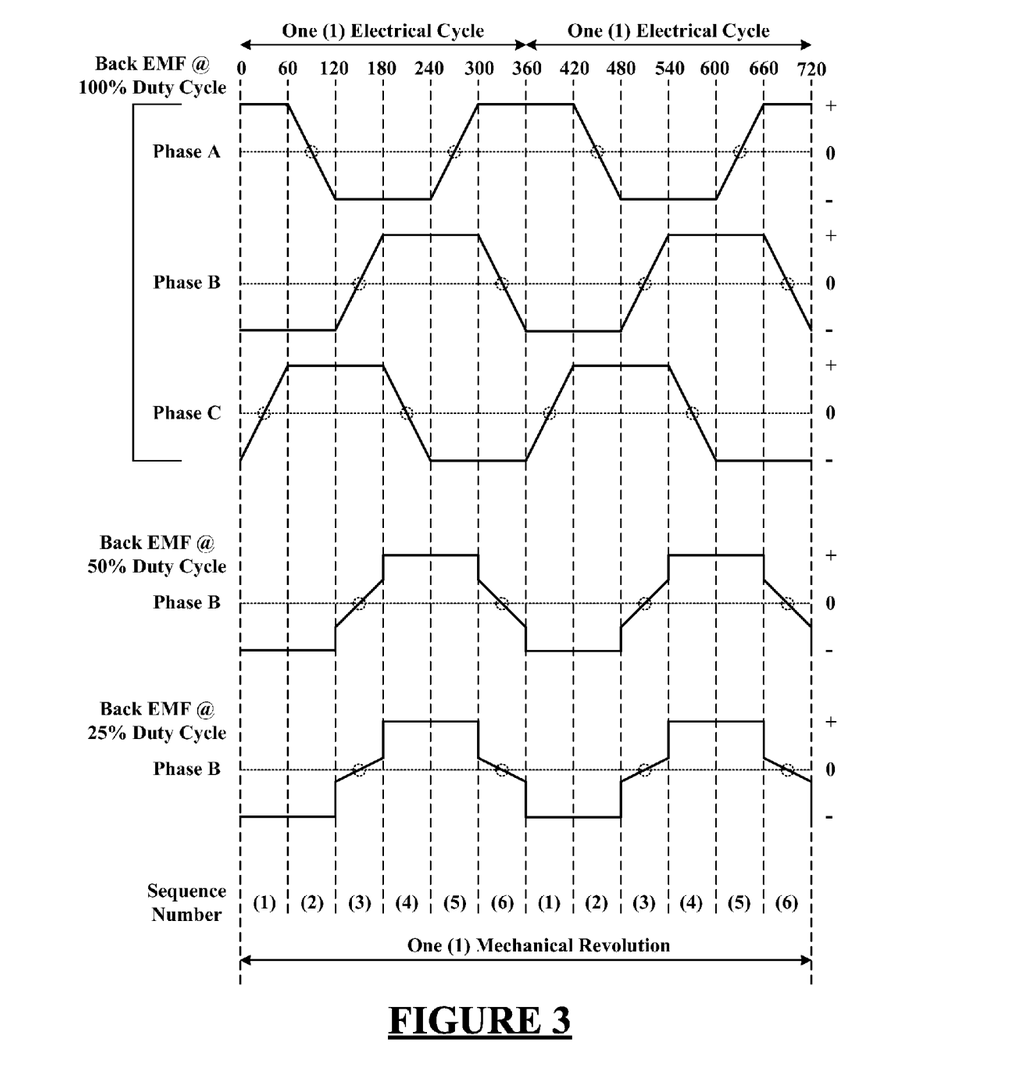
FIG. 3 illustrates schematic timing and amplitude graphs of a four-pole motor showing back electromotive force (EMF) voltages at each of the three stator windings during each 60 degree commutation period.

Referring to FIG. 3, depicted are schematic timing and amplitude graphs of a four-pole motor showing back electromotive force (EMF) voltages at each of the three stator windings during each 60 degree commutation period. When a phase coil is not connected to the DC power source no current flows therethrough. When a phase coil is connected to the positive (DC+) power source, current flows in a positive direction for two commutation periods (120 electrical degrees), then no current flows (coil is unconnected from the DC power source) for a subsequent commutation period (60 electrical degrees), and after the unconnected commutation period the very same coil has current flow in a negative direction for two commutation periods (120 electrical degrees) when connected to the negative (DC−) power source, and then no current flows in a next commutation period (60 electrical degrees) before the aforementioned electrical cycle repeats, i.e., for another 360 degree electrical cycle.

When using a sensorless BLDC motor, the back EMF voltage on the unconnected coil is transitioning from the positively driven polarity to the negatively driven polarity and does so throughout the 60 degree period when not being connected. If current is initially going into the coil when the connection is broken then the current will continue to flow thereby forward biasing a diode in parallel with the low-side drive transistor 110 presenting a voltage on the motor coil terminal equal to the negative (DC−) power source voltage plus the forward bias voltage of the diode. This negative spike persists until the energy in the coil is dissipated.

A "zero crossing" is where the measured voltage at each phase coil 102 goes to substantially one-half of the DC supply voltage (in the graphs normalized to "zero"), and is illustrated by the small circles of the back EMF graphs. When the PWM duty cycle is 100% in a commutation period, the measured back EMF varies between the full positive (DC+) rail voltage and the full negative (DC−) rail voltage of the power source. When the PWM duty cycle is 50% in a commutation period, the measured back EMF varies between 50% (one-half) of the full positive (DC+) rail voltage and 50% (one-half) of the full negative (DC−) rail voltage of the power source. When the PWM duty cycle is 25% in a commutation period, the measured back EMF varies between 25% (one-half) of the full positive (DC+) rail voltage and 25% (one-half) of the full negative (DC−) rail voltage of the power source. Therefore there is a direct correlation between the PWM duty cycle applied to the two current carrying coils 102 and the measured back EMF on the unconnected coil 102. However, the back EMF always passes through the "zero crossing" point at substantially the center (e.g., middle, half-way point) of a commutation period when the other two coils are excited (current flowing therethrough). Just at lower PWM duty cycles, there is less variation of the back EMF voltage in the commutation period. This is not problematic since the "zero crossing" point is what is of interest.

It is important to remember that back EMF on the unconnected coil 102 is biased properly for detection only when the other two coils 102 are connected to the positive (DC+) and negative (DC−) power source rails and current flows, through them. If there is no current flow in the two connected coils 102 at the time when a "zero crossing" should occur then the back EMF voltage at the unconnected coil 102 will not be centered relative to the reference voltage, and detection of the exact "zero crossing" will not be possible. However, missing detection of the exact "zero crossing" point in time because power drive is off (no current flow) at the instant of exact zero crossing may not be fatal so long as a change in polarity, e.g., positive to negative or visa versa, of the back EMF is determined when the power drive returns soon after zero crossing, and that this occurs close enough in time (electrical degrees) so as not to cause too great of a commutation timing error in normal operation. Instability problems do result when low duty cycle PWM signals cause significant commutation timing errors. As illustrated in the back EMF graphs shown in FIG. 5, "zero crossing" points occur at approximately 30 electrical degrees from a commutation period change, i.e., substantially in the center (middle) of a commutation period.

Figure 4:
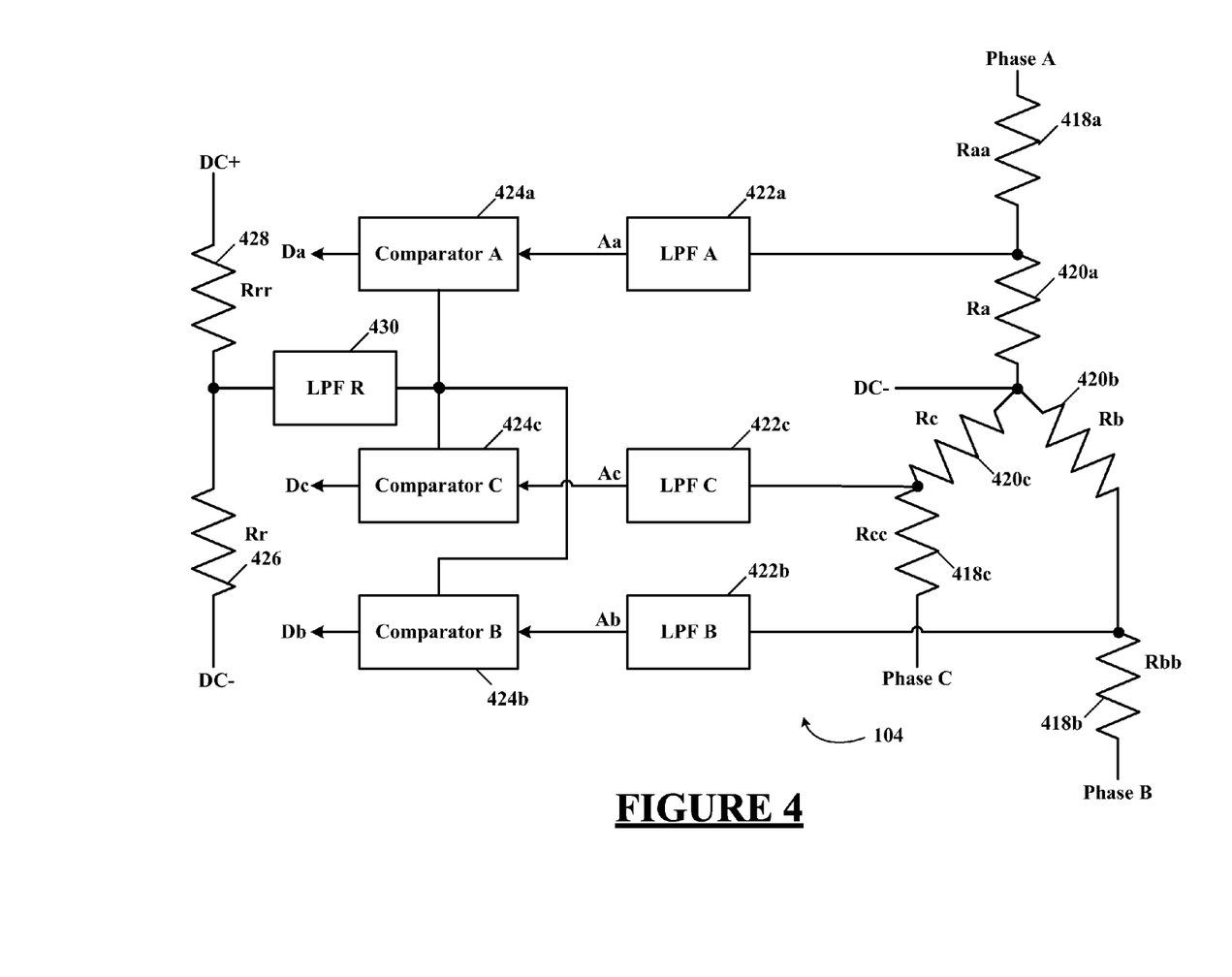
FIG. 4 illustrates a more detailed schematic diagram of the back EMF zero-cross detectors shown in FIG. 1.

Referring to FIG. 4, depicted is a more detailed schematic block diagram of the back EMF zero-cross detectors shown in FIG. 1. The back EMF zero-cross detectors 104 may comprise three-phase voltage divider resistors 418 and 420, phase low-pass filters 422, reference low-pass filter 430, reference voltage divider resistors 426 and 428, and voltage comparators 424. The reference voltage divider resistors 426 and 428 are used to derive a "virtual" neutral reference voltage for use by the comparators 424 and/or the digital device 106 having analog inputs. The three-phase voltage divider resistors 418 and 420 reduce the stator coils 102 voltages to much lower voltages for use by the low-pass filters 422 and comparators 424. Preferred resistance relationships for the resistors 418, 420, 426 and 428 are as follows:

$$Raa=Rbb=Rcc=Rrr$$

$$Ra=Rb=Rc=2*Rr$$

$$Ra/(Raa+Ra)=V\text{comparator\_maximum\_input}/((DC+)-(DC-))$$

The low pass filters 422 may be used to substantially reduce unwanted noise from the inputs to the comparators 424. The comparators 424 are used in determining when a back EMF voltage on an unconnected coil 102 is greater than the neutral reference voltage, or less than or equal to the neutral reference voltage. The outputs of the comparators 424 when at a logic high ("1") may represent that the back EMF voltage is greater than the neutral reference voltage, and when at a logic low ("0") may represent that the back EMF voltage is less than or equal to the neutral reference voltage, or visa-versa (designer's choice). The outputs of each of the comparators 424 may thereby be used to indicate when the back EMF voltage is at its "zero" transition point or when a back EMF polarity transition occurs, and indicate same to the digital device 106. If the digital device has analog inputs and analog-to-digital (ADC) conversion capabilities and/or voltage comparators, the external comparators may not be required. When this is the case, the outputs from the low pass filters and the neutral reference voltage from the resistors 426 and 428 may be connected directly to the analog inputs (not shown) of the digital device 106 (e.g., mixed signal device).

Figure 5:
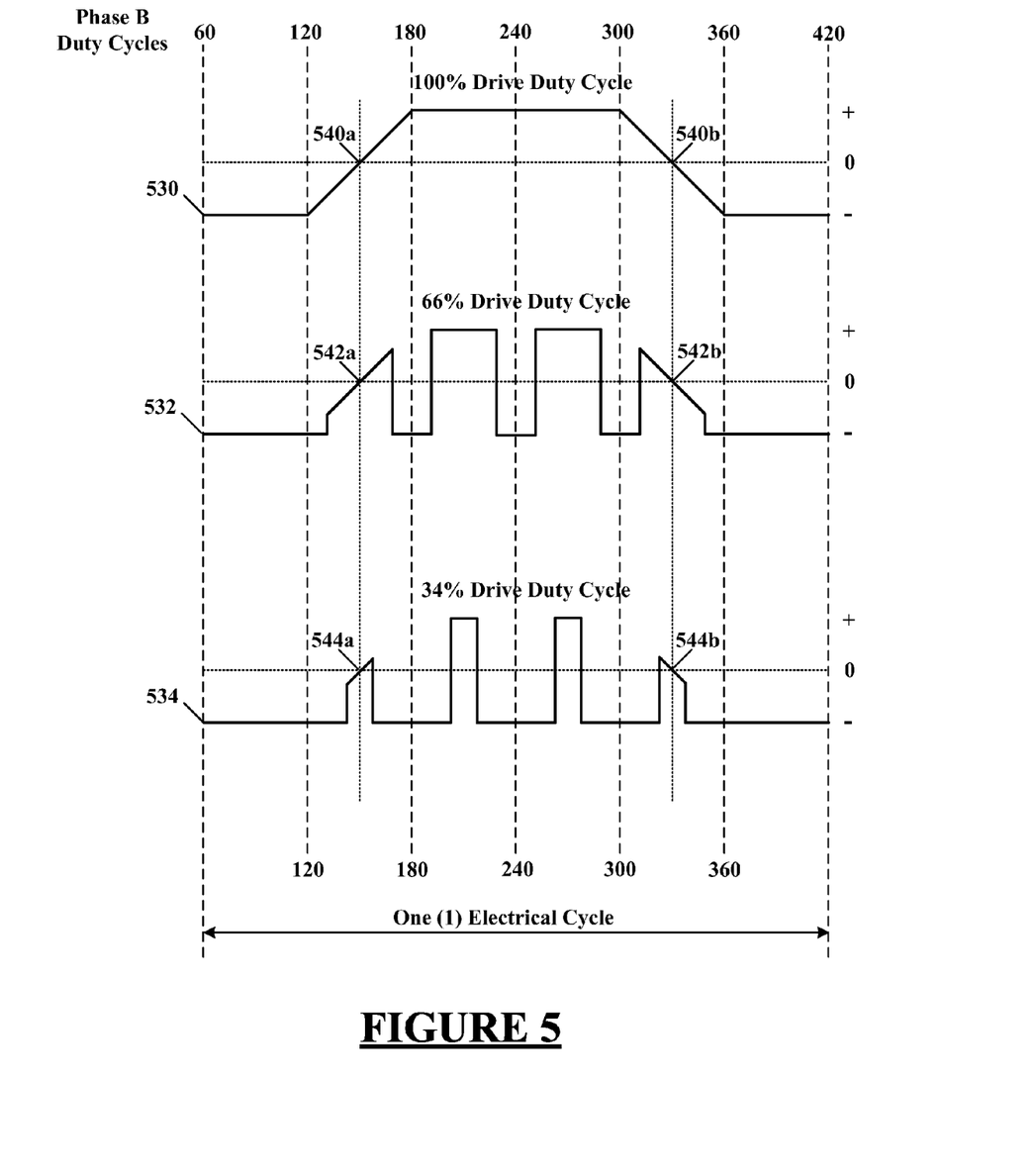
FIG. 5 illustrates schematic amplitude and timing graphs of voltages at one phase of the sensorless BLDC motor during each commutation period for different PWM duty cycles, according to the teachings of this disclosure.

Referring to FIG. 5, depicted are schematic amplitude and timing graphs of voltages at one phase of the sensorless BLDC motor during each commutation period for different PWM duty cycles, according to the teachings of this disclosure. The BLDC motor operates at rotational speeds that are dependent upon the average voltages on each stator coil 102 during appropriate 60 degree commutation periods. Direction of rotation of the motor 100 is dependent upon the commutation connection order of the coils 102 to the DC power source over each (360 degree) electrical cycle.

Graph 530 represents a 100 percent PWM drive duty cycle over one electrical cycle at one phase of the motor 100. The 100 percent duty cycle will result in maximum voltages resulting in maximum rotational speed of the motor 100. Graph 532 represents approximately a 66 percent PWM drive duty cycle over one electrical cycle at one phase of the motor 100. And graph 534 represents approximately a 34 percent PWM drive duty cycle over one electrical cycle at one phase of the motor 100. At lower duty cycles, less average voltages will be created and thus slower rotational speeds will result. Note that the PWM pulses are substantially centered within each of the commutation periods, e.g., at 30, 90, 150, 210, 270, 330 degrees. The exact electrical center for each of the commutation periods may be shifted slightly +/− from the +30 degree values depending upon inductive lag and motor characteristics. Determination of commutation period timing relationships are determined by the digital device 106 from "zero crossing" information supplied by the back EMF zero-cross detectors 104. Since only one PWM pulse is used, two transitions (on and off), in each appropriate drive commutation period, switching losses of the power switching transistors 108 and 110 are thereby minimized. In addition, since the one PWM pulse during each commutation period is substantially centered therein, there will always be back EMF excitation voltage in an unconnected coil 102 during a "zero-crossing" (e.g., at points 540, 542 and 544). Therefore, even during low PWM drive duty cycles where the off times of the PWM signals in each commutation period are significant, a "zero-crossing" (points 540, 542 and 544) will be accurately and precisely detected.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for controlling speed of a sensorless brushless direct current motor which is controlled by N commutation periods wherein the N commutation periods define one rotation of the sensorless brushless direct current motor, said method comprising the steps of:

determining the center of each commutation period in an electrical cycle of a sensorless brushless direct current motor by measuring back electromotive force voltage at each phase connection of the sensorless brushless direct current motor;

generating pulse width modulation (PWM) control pulses, the PWM control pulses each having one on and one off transition during respective ones of the commutation periods, wherein each single PWM control pulse is substantially centered within its respective commutation period; and driving power switching transistors with the PWM control pulses for each of the commutation periods, wherein the power switching transistors are connected between stator coils of the sensorless brushless direct current motor and a direct current power source.

2. The method according to claim 1, wherein the sensorless brushless direct current motor is a three-phase motor and has six commutation periods in an electrical cycle.

3. The method according to claim 2, wherein each of the commutation periods is 60 degrees in the electrical cycle and the electrical cycle is 360 degrees.

4. The method according to claim 2, wherein the step of determining the center of each commutation period comprises the steps of:

applying the direct current power source to two phases of the three-phase motor;

measuring the back electromotive force voltage at a third phase of the three-phase motor while not connected to the direct current power source until all six commutation periods are so measured; and determining when each of the PWM control signals is to be generated so as to be substantially centered within its respective commutation period.

5. The method according to claim 4, wherein the step of determining when each of the PWM control signals is to be generated comprises centering the PWM control signal in the respective commutation period during a substantially peak value of the measured back electromotive force voltage.

6. A method for controlling speed of a sensorless brushless direct current motor, said method comprising the steps of:

determining electrical timing centers for each of a plurality of commutation periods of a sensorless brushless direct current motor by measuring back electromotive force voltages at each stator coil of the sensorless brushless direct current motor, and determining from the measured back electromotive force voltages when each of the measured back electromotive force voltages is at substantially a zero-crossing voltage value, wherein the zero-crossing voltage value is about one-half of a voltage value of a direct current power source;

generating a single pulse width modulation (PWM) control pulse during each of the plurality of commutation periods, wherein each single PWM control pulse has one on and one of transition during its respective commutation period and the single PWM control pulse for the respective commutation period is substantially centered within that respective commutation period; and driving power switching transistors with the PWM control pulses during the plurality commutation periods, wherein the power switching transistors are connected between the stator coils of the sensorless brushless direct current motor and the direct current power source.

7. The method according to claim 6, wherein the sensorless brushless direct current motor is a three-phase sensorless brushless direct current motor and has six commutation periods in an electrical cycle.

8. The method according to claim 7, wherein each of the commutation periods is 60 degrees in the electrical cycle and the electrical cycle is 360 degrees.

9. The method according to claim 7, wherein the step of determining electrical timing centers comprises the steps of:

applying the direct current power source to two stator coils of the three-phase sensorless brushless direct current motor; and measuring the back electromotive force voltage at a third stator coil of the three-phase sensorless brushless direct current motor while not connected to the direct current power source.

10. The method according to claim 6, wherein a rotational speed of the sensorless brushless direct current motor is determined by a time that each PWM control pulse is on within the respective commutation period.

11. The method according to claim 10, wherein about the first fifty percent of the on time of the PWM control pulse is before the electrical timing center of the respective commutation period, and about the last fifty percent of the on time of the PWM control pulse is after the electrical timing center of the respective commutation period.

12. The method according to claim 10, wherein about the first half of when the PWM control pulse is on is before the electrical timing center of the respective commutation period, and about the last half of when the PWM control pulse is on is after the electrical timing center of the respective commutation period.

13. The method according to claim 10, wherein half of the on time of the PWM control pulse is substantially before the electrical timing center of the respective commutation period, and a remaining half of the on time of the PWM control pulse is substantially after the electrical timing center of the respective commutation period.

14. The method according to claim 4, wherein measuring the back electromotive three voltage comprises determining a zero-crossing of the back electromotive force voltage.

15. The method according to claim 5, wherein measuring the back electromotive force voltage comprises determining a zero-crossing of the back electromotive force voltage.

16. The method according to claim 14, further comprising low pass filtering the back electromotive force voltage.

17. The method according to claim 15, further comprising low pass filtering the back electromotive force voltage.

18. An arrangement for controlling speed of a sensorless brushless direct current motor which is controlled by N commutation periods wherein the N commutation periods define one rotation of the sensorless brushless direct current motor, comprising:

a sensorless brushless direct current motor having a plurality of phases;

a plurality of power switching transistors for selectively connecting two of the plurality of phases of the sensorless brushless direct current motor with a direct current power source;

a plurality of back EMF zero-cross detectors coupled with the phases of the sensorless brushless direct current motor; and a control unit being operable:

to determine the center of each commutation period in an electrical cycle of a sensorless brushless direct current motor by measuring back electromotive force voltage at each phase connection of the sensorless brushless direct current motor;

to generate pulse width modulation control pulses, the PWM control pulses each having one on and one off transition during respective ones of the commutation periods, wherein each single PWM control pulse is substantially centered within its respective commutation period; and to drive said power switching transistors with the PWM control pulses for each of the commutation periods.

19. The arrangement according to claim 18, wherein the sensorless brushless direct current motor is a three-phase motor and has six commutation periods in an electrical cycle.

20. The arrangement according to claim 19, wherein each of the commutation periods is 60 degrees in the electrical cycle and the electrical cycle is 360 degrees.

21. The arrangement according to claim 19, wherein for determining the center of each commutation period the control unit is further configured:

to apply the direct current power source to two phases of the three-phase motor;

to measure the back electromotive force voltage at a third phase of the three-phase motor while not connected to the direct current power source until all six commutation periods are so measured; and to determine when each of the PWM control signals is to be generated with respect to the determined center so as to be substantially centered within its respective commutation period.

22. The arrangement according to claim 21, wherein for determining when each of the PWM control signals is to be generated the control unit centers the PWM control signal in the respective commutation period during a substantially peak value of the measured back electromotive force voltage.

23. The arrangement according to claim 18, comprising a plurality of zero-crossing comparators coupled with each phase of the sensorless brushless direct current motor.

24. The arrangement according to claim 23, further comprising a plurality of low pass filters preceding each zero-crossing comparators and a reference low pass filter coupled with each of the zero-crossing comparators.

25. The arrangement according to claim 23, further comprising a plurality of voltage divider resistors each coupled between a reference potential and said phases wherein a tap of each voltage divider is coupled with a respective low pass filter.

* * * * *

UNITED STATES PATENT AND TRADEMARK OFFICE
CERTIFICATE OF CORRECTION

| | | |
|---|---|---|
| PATENT NO. | : 8,378,606 B2 | Page 1 of 1 |
| APPLICATION NO. | : 12/767052 | |
| DATED | : February 19, 2013 | |
| INVENTOR(S) | : Ward R. Brown | |

It is certified that error appears in the above-identified patent and that said Letters Patent is hereby corrected as shown below:

Column 9, lines 30-32
Claims, Claim 14, Delete "The method according to claim 4, wherein measuring the back electromotive three voltage comprises determining a zero-crossing of the back electromotive force voltage." Insert -- THE METHOD ACCORDING TO CLAIM 4, WHEREIN MEASURING THE BACK ELECTROMOTIVE FORCE VOLTAGE COMPRISES DETERMINING A ZERO-CROSSING OF THE BACK ELECTROMOTIVE FORCE VOLTAGE. --

Signed and Sealed this
Fourth Day of June, 2013

Teresa Stanek Rea
*Acting Director of the United States Patent and Trademark Office*